(12) United States Patent
Baron et al.

(10) Patent No.: US 6,245,373 B1
(45) Date of Patent: *Jun. 12, 2001

(54) ACIDIFIED FRUIT AND ICED TEA BEVERAGES INCORPORATING HIGH INTENSITY SWEETENER BLENDS

(75) Inventors: Robert F. Baron, Phillipsburg; Lisa Y. Hanger, Basking Ridge, both of NJ (US)

(73) Assignee: Nutrinova, Inc., Somerset, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/675,937

(22) Filed: Sep. 29, 2000

Related U.S. Application Data

(63) Continuation-in-part of application No. 09/186,901, filed on Nov. 6, 1998, now abandoned.

(51) Int. Cl.⁷ .............. A23L 1/236; A23L 2/00; A23F 3/00
(52) U.S. Cl. .......... 426/548; 426/658; 426/590; 426/597; 426/599
(58) Field of Search .................. 426/548, 658, 426/650, 590, 597, 599

(56) References Cited

U.S. PATENT DOCUMENTS

| | | | |
|---|---|---|---|
| 3,780,189 | 12/1973 | Scott | 426/212 |
| 4,158,068 | 6/1979 | Lipinski et al. | 426/548 |
| 4,495,170 | 1/1985 | Beyts et al. | 424/48 |
| 4,915,969 | 4/1990 | Beyts | 426/548 |
| 5,380,541 | 1/1995 | Beyts et al. | 426/548 |
| 5,500,232 | 3/1996 | Keating | 426/74 |
| 5,976,602 | 11/1999 | Baron et al. | 426/548 |
| 5,993,882 | 11/1999 | Hanger et al. | 426/548 |

FOREIGN PATENT DOCUMENTS

| | | | |
|---|---|---|---|
| 195 25 793 | 1/1997 | (DE) | C12G/3/02 |

OTHER PUBLICATIONS

Stempfl, W., Et Al., "Susser Stoff", Getrankeindustrie, vol. 49, No. 4, 1995, pp. 253, 256–259.

Stempfl, W., Et Al., "Stability of Acesulfame K/Aspartame Sweetener Blends", Soft Drinks Management International, Sep. 1995 (19995–09), pp. 20–23.

Abstract of Robert F. Baron and Lisa Y. Hanger, published Jul., 1996, entitled Using Acid Level, HIS Blend Ration and Flavor Profiles of Fruit Flavored Beverages.

*Primary Examiner*—Anthony J. Weier
(74) *Attorney, Agent, or Firm*—Michael W. Ferrell

(57) ABSTRACT

Acidified beverages contain an acidulant, a flavor component and a high intensity sweetener mixture of aspartame and acesulfame potassium. The beverages exhibit high flavor, low chemical taste, balanced sourness and superior overall blendedness when the ratio of aspartame to acesulfame potassium is from about 4:1 to about 2:1.

21 Claims, No Drawings

ACIDIFIED FRUIT AND ICED TEA BEVERAGES INCORPORATING HIGH INTENSITY SWEETENER BLENDS

This application is a continuation-in-part application of U.S. Ser. No. 09/186,901, filed Nov. 6, 1998 now abandoned.

CROSS-REFERENCE TO RELATED APPLICATION

The subject matter of this case generally relates to that of U.S. patent application Ser. No. 08/771,096, filed Dec. 20, 1996, now U.S. Pat. No. 5,993,882, issued Nov. 30, 1999, entitled "Sweetener Blends for Raspberry Flavored Beverages" and U.S. Patent Ser. No. 09/072,775, filed May 6, 1998, now U.S. Pat. No. 5,976,602, issued Nov. 2, 1999, entitled "Method of Formulating Acidified Cola Beverages and Compositions so Formulated".

TECHNICAL FIELD

This patent relates generally to beverage compositions including high intensity sweeteners, and specifically relates to acidified beverages of tea, lemon, mango, strawberry and cranberry flavors sweetened with a blend of acesulfame potassium and aspartame.

BACKGROUND ART

Blends of high intensity sweeteners are known as shown, for example, in U.S. Pat. No. 4,158,068 to Von Rymon Lipinski el al. Blends of acesulfame K with other high intensity sweeteners tend to exhibit more sucrose-like taste than is otherwise found, although other blends have been disclosed. See U.S. Pat. No. 4,495,170 for blends of chlorodeoxysucroses with a variety of other high intensity sweeteners, as well as U.S. Pat. No. 3,780,189 for blends of saccharin with aspartame and related material.

Fruit beverages may include an acidulant, a flavor component as well as a sweetener. See, for example, U.S. Pat. No. 5,500,232 of Keating at Columns 3–4. See also, U.S. Pat. No. 5,380,541 at Column 7, Example 4; and Abstract of Robert F. Baron and Lisa Hanger (Published July, 1996).

SUMMARY OF INVENTION

It has been found that certain acidified beverages exhibit superior sensory characteristics when sweetened with a blend of acesulfame potassium sometimes referred to as acesulfame K and aspartame. Beverages in accordance with the invention are formulated with a flavor component selected from tea, lemon, strawberry, cranberry and mango, a high intensity sweetener mixture of acesulfame potassium and aspartame, an acidulant and water. The acidulant is operative to maintain the pH of the beverage at a pH of about 3 or greater, preferably in the range of 3to about 4.

The ratio of aspartame to acesulfame potassium is generally from about 4.5:1 to about 1.5:1 parts by weight, from about 4:1 to about 2:1 being typical. It was unexpectedly found that a ratio of aspartame to acesulfame potassium of 4:1 was particularly preferred for mango beverages while a ratio of 2:1 was particularly preferred for tea, lemon and cranberry beverages.

The acidulant, or acid component, may be any suitable acid, such as phosphoric acid; however, malic and citric acid are preferred in accordance with the present beverage formulations. An alkali metal salt of an organic acid may be added if so desired, preferably in an amount of from about 0.1 to about 0.3 percent by weight. Unless otherwise indicated, percentages appearing below refer to weight percentage of the subject formulation.

The amount of sweetener used in beverages will vary slightly from flavor to flavor. The total amount of sweetener is related to the required sweetness of the final product. The preferred sweetness of each beverage flavor is a function of the beverage industry and consumer demand. It is generally recognized that products similar to the lemon and mango juice beverages tend to be preferred with sweetener levels of about 400 to about 500 parts per million by weight of sweetener. Other beverages had preferred ranges as follows:

| FLAVOR | PREFERRED SWEETENER MIXTURE CONCENTRATION ppm |
| --- | --- |
| Tea | 250–350 |
| Strawberry | 300–400 |
| Cranberry | 350–450 |

In general, it was found that from about 200 to about 500 parts per million by weight of the acesulfame potassium/aspartame sweetener mixture was most suitable.

DETAILED DESCRIPTION

The invention is described in detail below in connection with numerous examples which are intended as illustrative only. The invention is defined in the appended claims.

Various juice beverages were formulated containing from 5 to 25 percent by weight juice. Different juice levels were used to be representative of juice content in commercially available beverages. Additionally, iced tea beverages were also evaluated. All beverages are formulated to have a pH of 3 or greater. The preferred combinations were those with high flavor scores, low chemical and bitterness scores, high blendedness scores and a balance sour score (less than 5, more than 2). Fruit juice and iced tea beverages were formulated using the ingredients in Table A.

TABLE A

Ingredients

| FLAVOR COMPONENTS | SUPPLIER |
| --- | --- |
| Flavors | |
| Mango Melon 341340 | Givaudan Roure, Cincinnati, OH |
| Kiwi Strawberry 133739 | Givaudan-Roure, Cincinnati, OH |
| Lemon 9/79K404 | Dragoco, Totowa, NJ |
| Natural Lemon Oil 3202 | Ottens Flavor, Philadelphia, PA |
| Cranberry Raspberry 4813173/BM | Bell Flavors, Northbrook, IL |
| Tea Extract 8030 | Fidco, Solon, OH |
| Juice Concentrates | |
| Mango Puree 15/17 Brix | Gillette, Union, NJ |
| Mango 65 Brix | Gillette, Union, NJ |
| Strawberry 65 Brix | Kerr, Salem, OR |
| Lemon 400 GPL | Gillette, Union, NJ |
| Cranberry s50 Brix | Kerr, Salem, OR |
| Additional Components | |
| Acesulfame Potassium | Nutrinova, Inc., Somerset, NJ |
| Aspartame (APM) | Nutrasweet, St. Louis, MO |
| Citric Acid | ADM, Decatur, IL |

TABLE A-continued

Ingredients

| FLAVOR COMPONENTS | SUPPLIER |
| --- | --- |
| Malic Acid | Bartek Ingredients Inc., Ontario, Canada |
| Sodium Citrate | ADM, Decatur, IL |
| Sucrose | Mallinckrodt, Paris, KY |

The various beverages are formulated as follows:

Mango Melon (10% juice):

The mango melon beverage formulations are included in the following table. The sweeteners are defined as ranges, this is a result of the experimental design which required varying sweetener ratios. Additionally, the acid level varied as part of the experimental design, hence a range of citric acid was used in the formulation.

The beverage is prepared by mixing the juice concentrate (s), flavors, acid, and water. This mixture is then heated to 180° F., the sweeteners are added and then the beverage is sealed and cooled. The heat processing step was performed to mimic a standard hot filling process which is common in juice and tea beverages. The sweeteners are added after the hot fill to eliminate possible breakdown of aspartame during the heating process. The juice content of this beverage is 10%. Juice content is based on a regulatory definition of single strength juices.

TABLE B

Mango Beverage Formulations

| Ingredient | % |
| --- | --- |
| Mango Concentrate | 0.60 |
| Mango Puree | 1.00 |
| Mango Melon Flavor | 0.28 |
| Citric Acid | 0.0–0.28 |
| Aspartame | 0.016–0.05 |
| Acesulfame Potassium | 0.0–0.016 |
| Water | Balance to 100% |

Lemonade (10% juice):

The lemonade is prepared in similar manner to the mango melon beverage. Flavors, concentrate(s), acid, buffer, and water are mixed and heated, sweeteners are added, and beverage is bottled. The main difference from the previous formulation is the use of a buffer (sodium citrate). The lemon juice concentrate has a very low pH which results in a finished lemonade pH that is too low to fit into the design range of 3 or greater. Therefore the buffer is added to raise the pH. The formulation is outlined in the following table.

TABLE C

Lemonade Formulations

| Ingredient | % |
| --- | --- |
| Lemon Juice Concentrate | 0.84 |
| Flavor | 0.08 |
| Lemon Oil | 0.04 |
| Citric Acid | 0.0–0.08 |
| Sodium Citrate | 0.0–.25 |
| Aspartame | 0.016–0.05 |
| Acesulfame Potassium | 0.0–0.016 |
| Water | Balance to 100% |

Cranberry Raspberry (25% juice):

The Cranberry Raspberry juice is formulated in the same maimer as previously defined. This juice however, contains both malic and citric acid as the acidulant. Combining acids is common practice in beverages. The formulation is outlined below.

TABLE D

Cranberry Beverage Formulations

| Ingredient | % |
| --- | --- |
| Apple Juice Concentrate | 1.64 |
| Raspberry Juice Concentrate | 1.06 |
| Cranberry Juice Concentrate | 0.87 |
| Flavor | 1.10 |
| Malic Acid | 0.0–26 |
| Citric Acid | 0.0–0.26 |
| Sodium Citrate | 0.0–.25 |
| Aspartame | 0.016–0.05 |
| Acesulfame Potassium | 0.0–0.016 |
| Water | Balance to 100% |

Strawberry Kiwi (5% juice):

The Strawberry Kiwi juice beverage is prepared in a similar manner to the previous examples. The formulation for this beverage is detailed in the following table. This beverage includes pectin, which is used to provide viscosity and mouth feel. The pectin is solubilized prior to mixing of other ingredients. Additionally, malic acid is used as the acidulant. Malic acid is often used in juice beverages. The process then followed that previously defined.

TABLE E

Strawberry Beverage Formulations

| Ingredient | % |
| --- | --- |
| Strawberry Juice Concentrate | 0.25 |
| Kiwi Juice Concentrate | 0.47 |
| Apple Juice Concentrate | 0.16 |
| Pectin | 0.15 |
| Flavor | 0.10 |
| Malic Acid | 0.0–0.37 |
| Aspartame | 0.0165–0.045 |
| Acesulfame Potassium | 0.0–0.0165 |
| Water | Balance to 100% |

Iced Tea

The Iced Tea is prepared by blending dry ingredients (maltodextrin, tea powder, tea essence, malic acid, and flavor) with water. The mixture is heated to 180° F., sweeteners are added and the mixture is bottled. The formulation is outlined in the following table. Malic acid is selected as the acidulant because it is a common acid in iced tea beverages.

TABLE F

Iced Tea Formulations

| Ingredient | % |
| --- | --- |
| Maltodextrin | 2.34 |
| Tea Powder | 0.21 |
| Tea Essence | 0.032 |
| Flavor | 0.008 |
| Malic Acid | 0.24–0.32 |
| Aspartame | 0.015–0.045 |
| Acesulfame Potassium | 0.0–0.015 |
| Water | Balance to 100% |

Beverages formulated as above with different levels of sweetener (sucrose, aspartame, acesulfame potassium) acid (malic, citric) and buffer (sodium citrate) are evaluated by trained panels of 6–8. The beverages are evaluated for their flavor components, sweeteners, sour, chemical and blendedness. The melon mango beverages are also evaluated for astringency, however this property does not vary significantly in most cases.

Standard references (Meilgaard et al., *Sensory Evaluation Techniques*, CRC Press, Inc., Boca Raton, Fla., 1990, 1991) for flavor (universal scale) and taste (basic) attributes are used. A 15 cm line scale is used in accordance with Chapter 8. See Table G hereafter for reference values.

Results for the various beverages are set forth in Tables 1–5 hereafter appearing.

Table 1 includes the results for some of the more important flavor characteristics for Mango Melon beverages formulated as above. The 10.0% sucrose sample can be considered a bench mark of what the optimum beverage would be. The tables also include an all aspartame (sometimes referred to herein as "APM") sweetened beverage. Additionally, all other samples have comparable scores for flavors, chemical, and blendedness. The sour levels could also be considered balanced.

Table 2 includes the results for some of the more important flavor characteristics for lemonade beverages formulated as above. This product formulation is somewhat different from others in that the juice concentrates are providing high levels of acid. This results in a pH that is out of the desirable range. Sodium citrate is used as a buffer to get the proper pH. The optimum sample for this test could be considered the 162.5 ppm Sunett®/300 ppm APM/0.1 Sodium Citrate. This sample has one of the lowest chemical scores and the highest blended score (with the exception of the sucrose sample). All other characteristics are close to the bench mark scores. All other Sunett®/APM samples also had very good number in comparison to the bench mark. The 100% APM sample had a slightly higher chemical score than any of the blends.

Table 3 includes the results for some of the more important flavor characteristics for Cranberry Raspberry beverages formulated as above. Of the Sunett®/APM samples, the 125 ppm Sunett®/195 ppm APM/0.13 Malic/0.13 Citric performed the best.

Table 4 contains the sensory results for Strawberry Kiwi beverages formulated as above. Of the blends evaluated the 112.5 Sunett®/242.5 APM/0.185% malic is considered the most optimized for the flavor characteristics defined below.

Table 5 includes mean scores for flavor characteristics that are considered important for Iced Tea Beverages formulated as above. The optimal sample from this test is defined as the one with 90 ppm Sunett®/190 APM/0.22% Malic. This sample is very similar to the sucrose bench mark for all characteristics. It received moderate tea scores, with a slight lemon note, chemical is among the lowest observed, and the product is similar in blended with the sucrose sample and slightly higher than the APM sample.

TABLE G

| Term | Definition | Reference |
|---|---|---|
| Fruit/Tea | The flavor associated with the component. | Universal Scale* |
| Sweet | The basic taste associated with sucrose. | Sucrose in water at various concentrations 2.0% = 2, 5.0% = 5, 10.0% = 10 |
| Chemical | The general perception of a chemical characteristic, giving a "flat" taste, does not include medicinal or antiseptic. | 0.25 gram of saccharin in 500 ml of water = 8 |
| Sour | The basic taste associated with citric acid. | Citric acid in water at various concentrations 0.50 g/L = 2, 0.80 g/L = 5, 1.5 g/L = 10, 2.0 g/L = 15.0 |
| Astringency | The combination of sensations, dominated by a dry mouth, teeth coating, furry tongue, and some puckering. | Alum 0.50 g in 500 ml of water = 6 1.0 g in 500 ml of water = 10 |
| Blendedness | Measure of how well flavors fit. | 15 cm scale* |

*References for flavor are from the "Universal Scale", wherein the lemon flavor in lemon frosting = 2; the milk flavor in whole milk = 5; the orange flavor in orange juice = 7.5; the grape flavor in grape juice = 10; the cinnamon flavor in cinnamon gum = 12; the coffee flavor in espresso coffee = 14. A score of 15 for blendedness indicates well balanced and no off-taste.

TABLE 1

Sweetener and Acid Levels Used in a Mango Melon Juice Beverage (10.0% Juice)
Mean ± Std. Dev.

| Sunett (ppm) | APM (ppm) | Sugar (%) | Citric Acid (%) | pH | Melon | Mango | Sweet | Sour | Chemical | Astringency | Blendedness |
|---|---|---|---|---|---|---|---|---|---|---|---|
| 75.0 | 162.5 | 0.0 | 0.0 | 4 | 6.3 ± 1.1 | 3.4 ± 1.2 | 9.0 ± 1.0 | 2.7 ± 1.4 | 2.7 ± 1.2 | 2.5 ± 1.3 | 10.8 ± 1.2 |
| 162.5 | 162.5 | 0.0 | 0.0 | 4 | 6.5 ± 1.4 | 3.7 ± 1.9 | 9.2 ± 1.1 | 2.3 ± 1.4 | 2.7 ± 1.2 | 2.9 ± 0.4 | 10.6 ± 1.8 |
| 75.0 | 300.0 | 0.0 | 0.0 | 4 | 6.7 ± 1.0 | 3.8 ± 1.6 | 9.5 ± 0.8 | 2.5 ± 0.8 | 2.8 ± 0.6 | 2.5 ± 1.0 | 10.9 ± 0.5 |
| 162.5 | 300.0 | 0.0 | 0.0 | 4 | 6.9 ± 1.5 | 3.5 ± 1.0 | 9.8 ± 1.1 | 2.1 ± 1.2 | 2.6 ± 1.8 | 1.8 ± 1.2 | 9.9 ± 1.4 |
| 119.0 | 231.0 | 0.0 | 0.1 | 3.25 | 6.6 ± 1.1 | 3.1 ± 1.7 | 9.6 ± 1.0 | 2.9 ± 1.4 | 2.9 ± 1.2 | 3.2 ± 0.9 | 10.0 ± 1.4 |
| 0.0 | 500.0 | 0.0 | 0.1 | 3.25 | 6.2 ± 1.5 | 2.9 ± 2.2 | 9.6 ± 0.8 | 2.8 ± 0.9 | 3.0 ± 1.3 | 3.1 ± 0.6 | 9.8 ± 1.2 |
| 0.0 | 0.0 | 10.0 | 0.1 | 3.25 | 7.0 ± 0.9 | 3.7 ± 1.2 | 9.8 ± 1.1 | 2.8 ± 0.7 | 1.6 ± 1.8 | 3.1 ± 0.6 | 11.4 ± 1.7 |

TABLE 2

Sweetener and Acid Levels Used in a Lemon Beverage (Lemonade) (10% Juice)
Mean ± Std. Dev.

| Sunett (ppm) | APM (ppm) | Sugar (%) | Citric Acid (%) | Sodium Citrate (%) | pH | Lemon | Sweet | Sour | Bitter | Chem | Blend | Imm Chem |
|---|---|---|---|---|---|---|---|---|---|---|---|---|
| 75.0 | 162.5 | 0.0 | 0.0 | 0.25 | 4 | 6.4 ± 0.9 | 9 ± 0.59 | 3.2 ± 0.8 | 1.9 ± 1.5 | 1.0 ± 1.2 | 8.7 ± 1.8 | 1.3 ± 1.2 |
| 162.5 | 162.5 | 0.0 | 0.0 | 0.25 | 4 | 6.7 ± 0.9 | 9.6 ± 0.80 | 3.1 ± 0.8 | 1.5 ± 1.4 | 2.0 ± 1.6 | 8.8 ± 2.2 | 2.2 ± 1.4 |
| 75.0 | 300.0 | 0.0 | 0.0 | 0.25 | 4 | 6.8 ± 0.9 | 9.8 ± 0.53 | 3.3 ± 0.7 | 2.2 ± 0.9 | 2.3 ± 0.9 | 9.1 ± 2.1 | 2.4 ± 0.9 |
| 162.5 | 300.0 | 0.0 | 0.0 | 0.25 | 4 | 7.2 ± 1.0 | 10.6 ± 0.54 | 3.2 ± 0.7 | 1.8 ± 1.0 | 1.0 ± 1.6 | 9.9 ± 2.3 | 1.3 ± 1.6 |
| 119.0 | 231.0 | 0.0 | 0.0 | 0.1 | 3.25 | 7.2 ± 1.4 | 10 ± 0.57 | 3.5 ± 0.7 | 2.0 ± 0.9 | 1.9 ± 1.2 | 9.4 ± 1.3 | 2.1 ± 1.2 |
| 0.0 | 500.0 | 0.0 | 0.0 | 0.1 | 3.25 | 7.3 ± 1.5 | 9.7 ± 0.81 | 3.2 ± 0.8 | 1.3 ± 1.3 | 2.6 ± 0.8 | 9.6 ± 2.2 | 2.5 ± 0.5 |
| 0.0 | 0.0 | 10.0 | 0.0 | 0.1 | 3.25 | 7.6 ± 0.9 | 10 ± 0.74 | 3.7 ± 0.7 | 2.0 ± 0.8 | 0.5 ± 1.0 | 11.8 ± 2.1 | 0.3 ± 0.8 |

TABLE 3

Sweetener and Acid Levels Used in a Cranberry Raspberry beverage (25% Juice)
Mean ± Std. Dev.

| Sunett (ppm) | APM (ppm) | Sucrose (%) | Malic Acid (%) | Citric Acid (%) | pH | Cranberry | Raspberry | Sweet | Sour | Bitter | Chemical | Blend |
|---|---|---|---|---|---|---|---|---|---|---|---|---|
| 150.0 | 150.0 | 0.0 | 0.00 | 0.00 | 3.5 | 1.0 ± 1.4 | 6.2 ± 1.5 | 9.3 ± 0.7 | 2.2 ± 1.0 | 0.8 ± 1.1 | 2.2 ± 0.9 | 6.4 ± 2.9 |
| 100.0 | 240.0 | 0.0 | 0.00 | 0.00 | 3.5 | 1.0 ± 1.3 | 5.4 ± 1.7 | 9.4 ± 0.4 | 2.4 ± 0.3 | 0.6 ± 1.0 | 2.4 ± 0.6 | 6.5 ± 1.0 |
| 125.0 | 195.0 | 0.0 | 0.13 | 0.13 | 3.0 | 3.7 ± 1.9 | 5.2 ± 1.4 | 8.5 ± 1.1 | 3.1 ± 0.8 | 1.0 ± 1.1 | 1.9 ± 0.9 | 7.5 ± 1.4 |
| 0.0 | 450.0 | 0.0 | 0.13 | 0.13 | 3.0 | 2.9 ± 3.3 | 5.8 ± 1.2 | 9.3 ± 0.3 | 2.8 ± 0.4 | 0.7 ± 1.1 | 2.1 ± 0.8 | 7.7 ± 1.1 |
| 0.0 | 0.0 | 9.0 | 0.13 | 0.13 | 3.0 | 4.1 ± 2.4 | 5.4 ± 2.6 | 9.1 ± 0.6 | 3.0 ± 0.5 | 0.5 ± 0.9 | 1.4 ± 1.1 | 9.1 ± 1.5 |

TABLE 4

Sweetener and Acid Levels Used in a Strawberry Kiwi beverage (5% Juice)
Mean ± Std. Dev.

| Sunett (ppm) | APM (ppm) | Sucrose (%) | Malic Acid (%) | pH | Strawberry | Kiwi | Sweet | Sour | Chem. | Blend |
|---|---|---|---|---|---|---|---|---|---|---|
| 165.0 | 165.0 | 0.0 | 0.0 | 3.5 | 5.8 ± 1.2 | 0.8 ± 1.7 | 10.4 ± 0.3 | 2.6 ± 0.8 | 1.8 ± 1.2 | 6.7 ± 0.5 |
| 60.0 | 320.0 | 0.0 | 0.0 | 3.5 | 4.6 ± 1.8 | 0.5 ± 1.0 | 10.0 ± 0.2 | 3.2 ± 1.3 | 1.7 ± 1.2 | 7.7 ± 0.6 |
| 112.5 | 242.5 | 0.0 | 0.185 | 3.25 | 6.9 ± 0.5 | 2.8 ± 1.9 | 10.3 ± 0.4 | 3.5 ± 0.7 | 2.1 ± 1.0 | 8.3 ± 1.0 |
| 0.0 | 450.0 | 0.0 | 0.185 | 3.25 | 6.9 ± 0.6 | 4.5 ± 0.9 | 9.0 ± 1.1 | 3.6 ± 0.5 | 1.9 ± 1.3 | 8.3 ± 0.9 |
| 0.0 | 0.0 | 9.0 | 0.185 | 3.25 | 7.2 ± 0.5 | 3.8 ± 1.2 | 9.8 ± 0.4 | 3.5 ± 0.8 | 1.2 ± 1.4 | 9.7 ± 1.8 |

TABLE 5

Sweetener and Acid Levels Used in an Iced Tea Beverage
Mean ± Std. Dev.

| Sunett (ppm) | APM (ppm) | Sucrose (%) | Malic Acid (%) | pH | Tea | Lemon | Chemical | Sweet | Sour | Bitter | Blendedness |
|---|---|---|---|---|---|---|---|---|---|---|---|
| 60.0 | 120.0 | 0.0 | 0.38 | 3.0 | 6.4 ± 0.9 | 1.6 ± 2.0 | 1.2 ± 1.4 | 7.6 ± 1.6 | 6.4 ± 1.9 | 2.0 ± 0.8 | 6.6 ± 1.7 |
| 120.0 | 120.0 | 0.0 | 0.06 | 4.0 | 6.5 ± 0.7 | 1.5 ± 1.6 | 2.0 ± 1.3 | 9.4 ± 1.1 | 2.3 ± 1.0 | 2.2 ± 0.3 | 8.5 ± 2.5 |
| 60.0 | 260.0 | 0.0 | 0.06 | 4.0 | 6.4 ± 0.8 | 0.4 ± 1.1 | 2.6 ± 0.3 | 10.0 ± 0.5 | 2.4 ± 1.2 | 1.7 ± 1.1 | 8.5 ± 2.3 |
| 120.0 | 260.0 | 0.0 | 0.38 | 3.0 | 6.7 ± 0.7 | 3.1 ± 1.6 | 2.2 ± 1.0 | 9.3 ± 1.2 | 4.8 ± 1.2 | 2.1 ± 0.9 | 7.1 ± 1.2 |
| 90.0 | 190.0 | 0.0 | 0.22 | 3.25 | 6.7 ± 0.8 | 2.6 ± 1.8 | 2.3 ± 1.2 | 9.3 ± 0.8 | 3.7 ± 0.9 | 1.7 ± 1.0 | 8.5 ± 1.6 |
| 0.0 | 400.0 | 0.0 | 0.22 | 3.25 | 7.1 ± 0.4 | 2.1 ± 1.7 | 2.6 ± 1.1 | 9.1 ± 1.1 | 4.3 ± 1.7 | 2.1 ± 0.1 | 8.1 ± 1.4 |
| 0.0 | 0.0 | 8.0 | 0.22 | 3.25 | 6.7 ± 0.4 | 3.1 ± 0.9 | 1.1 ± 1.2 | 9.5 ± 0.5 | 3.8 ± 0.9 | 0.8 ± 1.1 | 9.1 ± 1.4 |

What is claimed is:

1. An acidified fruit or iced tea beverage consisting essentially of a flavor component selected from the group consisting of tea, lemon, strawberry, cranberry and mango; a high intensity sweetener mixture of acesulfame potassium and aspartame; an acid component; and water wherein the ratio of aspartame to acesulfame k is from about 4.5:1 to about 1.5:1 and the acid component is operative to maintain the pH of the beverage above about 3.

2. The beverage according to claim 1, wherein the ratio of aspartame to acesulfame k is from about 4:1 to about 2:1.

3. The beverage according to claim 2, wherein the ratio of aspartame to acesulfame k is about 2:1.

4. The beverage according to claim 1, wherein said acid component is selected from the group consisting of citric acid and malic acid.

5. The beverage according to claim 4, wherein said acid is citric acid.

6. The beverage according to claim 4, wherein said acid is malic acid.

7. The beverage according to claim 1, further comprising an alkali metal salt of an organic acid.

8. The beverage according to claim 7, wherein said alkali metal salt of said organic acid is sodium citrate.

9. The beverage according to claim 1, wherein said beverage is a mango juice beverage and the ratio of aspartame to acesulfame potassium is about 4:1.

10. An acidified beverage consisting essentially of a flavor component selected from the group consisting of tea, lemon, strawberry and cranberry, a high intensity sweetener mixture of acesulfame potassium and aspartame, an acid component and water wherein the ratio of aspartame to acesulfame potassium is about 2:1.

11. The beverage according to claim 10, wherein said flavor component is a lemon flavor component.

12. The beverage according to claim 11, wherein said high intensity sweetener mixture is present in an amount of from about 400 to about 500 parts per million by weight.

13. The beverage according to claim 10, wherein said flavor component is a tea flavor component.

14. The beverage according to claim 13, wherein said high intensity sweetener mixture is present in an amount of from about 250 to about 350 parts per million by weight.

15. The beverage according to claim 10, said flavor component is a strawberry flavor component.

16. The beverage according to claim 15, wherein said high intensity sweetener mixture is present in an amount of from about 300 to about 400 parts per million by weight.

17. The beverage according to claim 10, wherein said flavor component is a cranberry flavor component.

18. The beverage according to claim 17, wherein said high intensity mixture is present in an amount of from about 350 to about 450 parts per million by weight.

19. An acidified fruit or iced tea beverage consisting essentially of a flavor component selected from the group consisting of tea, lemon, strawberry, cranberry and mango; a high intensity sweetener mixture of acesulfame potassium and aspartame; an acid component; and water wherein the ratio of aspartame to acesulfame k is from about 4.5:1 to about 1.5:1; and wherein said high intensity sweetener mixture is present in said beverage in an amount of from about 200 to about 500 parts per million by weight; and wherein further acid component is operative to maintain the pH of the beverage above 3.

20. The beverage according to claim 19, further comprising from 0.1 to about 0.3 percent of an alkali metal salt of an organic acid.

21. The beverage of claim 1 or claim 19 wherein the ph of the beverage is between 3 and 4.

* * * * *